United States Patent
Antreich

(10) Patent No.: US 6,948,762 B2
(45) Date of Patent: Sep. 27, 2005

(54) STOWAGE SPACE COVER OF A CONVERTIBLE

(75) Inventor: Michael Antreich, Germering (DE)

(73) Assignee: Open Air Systems GmbH, Stockdorf (DE)

( * ) Notice: Subject to any disclaimer, the term of this patent is extended or adjusted under 35 U.S.C. 154(b) by 0 days.

(21) Appl. No.: 10/679,286

(22) Filed: Oct. 7, 2003

(65) Prior Publication Data

US 2004/0075294 A1 Apr. 22, 2004

(30) Foreign Application Priority Data

Oct. 22, 2002 (DE) .......................................... 102 49 299

(51) Int. Cl.⁷ .............................................. B62D 25/10
(52) U.S. Cl. ............................. 296/136.06; 296/107.08; 296/107.17; 296/76
(58) Field of Search ...................... 296/107.01, 107.08, 296/107.16, 107.17, 136.01, 136.04, 136.05, 136.06, 56, 76

(56) References Cited

U.S. PATENT DOCUMENTS

| 5,823,606 | A | * | 10/1998 | Schenk et al. ......... 296/107.08 |
| 6,033,008 | A | * | 3/2000 | Mattila ................... 296/107.17 |
| 6,062,628 | A | | 5/2000 | Guillez |
| 6,092,335 | A | * | 7/2000 | Queveau et al. .............. 49/192 |
| 6,186,577 | B1 | * | 2/2001 | Guckel et al. ......... 296/107.07 |
| 6,250,707 | B1 | * | 6/2001 | Dintner et al. ................. 296/76 |
| 6,315,349 | B1 | * | 11/2001 | Kinnanen ................... 296/108 |
| 6,585,307 | B1 | * | 7/2003 | Queveau et al. ............... 296/76 |
| 6,595,572 | B2 | * | 7/2003 | Schuler et al. ......... 296/107.08 |
| 6,604,775 | B2 | * | 8/2003 | Obendiek ................... 296/108 |
| 6,702,361 | B2 | * | 3/2004 | Russke .................. 296/107.08 |
| 6,702,362 | B2 | * | 3/2004 | Eichholz et al. ............ 296/108 |
| 6,715,819 | B2 | * | 4/2004 | Weissmueller ......... 296/107.08 |
| 2001/0040386 | A1 | | 11/2001 | Miklosi et al. |
| 2002/0036413 | A1 | * | 3/2002 | Neubrand et al. ............. 296/76 |
| 2002/0093218 | A1 | * | 7/2002 | Weissmueller et al. ..... 296/136 |
| 2002/0140250 | A1 | * | 10/2002 | Hasselgruber et al. . 296/107.08 |
| 2003/0218354 | A1 | * | 11/2003 | Plesternings ........... 296/107.08 |
| 2004/0066057 | A1 | * | 4/2004 | Quindt et al. .......... 296/107.08 |
| 2004/0080178 | A1 | * | 4/2004 | Klein et al. ............ 296/107.08 |

FOREIGN PATENT DOCUMENTS

EP 0 857 598 B1 9/2001

* cited by examiner

*Primary Examiner*—H. Gutman
(74) *Attorney, Agent, or Firm*—Nixon Peabody LLP; David S. Safran

(57) ABSTRACT

A stowage space cover of a convertible with a roof (2) which can be opened and lowered into a rear stowage space (3), the stowage space cover (8) containing two elements (9, 10) which are joined to one another, the first element (9) being pivotally supported on the front on the body by means of a pivot bearing (13, 14) so as to pivot up at its rear edge (20), the second element (10) being pivotally supported on the first element (9) so that its front edge (19) can be pivoted up out of its closed position, in which it covers a recess of the first element (9) for stowing of the roof, and can be pivoted up jointly with the first element (9) as the trunk lid. To improve the sequence of movements of the cover, the pivoting support (13, 14) of the first element (9) forms a movable pivoting axis.

8 Claims, 2 Drawing Sheets

STOWAGE SPACE COVER OF A CONVERTIBLE

BACKGROUND OF THE INVENTION

1. Field of the Invention

The invention relates to a stowage space cover of a convertible type motor vehicle with a roof which can be opened and lowered into a rear stowage space, the stowage space cover having two elements which are joined to one another, the first element being pivotally supported at its front on the body by means of a pivoting support and it can be pivoted up at its rear edge, the second element being pivotally supported on the first element and with its front edge can be pivoted up out of its closed position in which it covers a recess of the first element, can be pivoted up in its closed position jointly with the first element as the trunk lid, and in the pivoted-up open position with the first element closed, clearing the recess for passage of the roof.

2. Description of Related Art

Published European Patent Application EP 0 857 598 B1 and its counterpart U.S. Pat. No. 6,062,626 disclose a convertible with a stowage space cover of the initially mentioned type which has a first element which is frame-shaped and which is pivotally supported at its front edge by a pivoting support which has a body-mounted pivot axis. The second element represents the flat cover of a recess which is formed in the first element and through which, with the second element opened and pivoted up, the roof can be deposited in the stowage space and can be moved out of it. In order to open the stowage space cover with the roof closed as the trunk lid, by pivoting its rear edge around the front body-mounted pivoting axis, it is opened. In this pivoting around the fixed front pivoting axis, the front edges of the first and the second element move on a respective pivoting path with the pivoting axis as a fixed pivot center. This fixed pivoting axis can lead to limitations in the configuration of the motor vehicle, and especially in the design of the stowage space cover, when the front edges do not have an unhindered path of movement and could collide with the rear roof part of the closed roof or with other body parts.

SUMMARY OF THE INVENTION

Therefore, a primary object of the present invention is to devise a stowage space cover of the initially mentioned type with a support which has improved pivoting behavior.

This object is achieved by the invention in the initially mentioned stowage space cover by the pivoting support of the first element forming a movable pivot axis for the pivoting first element. The movable pivoting axis, as compared to a pivoting axis which is stationary when pivoting, fundamentally, offers the possibility of impressing a certain dynamic behavior on the front edge of the stowage space cover when it is being opened or closed. This is useful and even necessary if, for a given construction, there were the danger of collision of components, such as the stowage space cover and the rear roof part of the lowerable roof or other adjacent body parts.

Preferably, the pivoting support is designed such that at least one section of the conventionally curved front edge of the stowage space cover is moved to the rear and/or upward. During opening, the first element which is, for example, a frame-shaped hatch carrier on which, for example, a flat hatch is pivotally supported as the second element, thus, is moved rearward and/or upward relative to the rear roof part or the bordering body part, especially the front ends of the two side parts or legs of the hatch carrier being guided on a matched lifting curve, free of collisions. Then, the pivot axis can be moved such that the front ends and the front edge of the stowage space cover are moved further rearward and/or upward, and thus, are moved away from the body parts and roof parts.

The pivoting support is formed, for example, by a multiple bar means, and especially a four-bar means, which pivotally supports the first element or the hatch carrier on both sides, but can also be formed from sliding guides and connecting rods. A drive means for the pivoting support of the stowage space cover can comprise, for example, an electric motor drive, a gas pressure spring or a hydraulic cylinder.

Preferably, there is a lock means for the stowage space cover which has two side locks which detachably lock the first element to the second element, on the one hand, and to the respective fixed point of the body, on the other. Due to the locks which are provided on both sides, the rear area of the convertible acquires additional stiffening. The locks can be made such that they enable several locking functions with corresponding actuation, yielding a simplified structure. Preferably, the two side locks are connected, for example, by means of Bowden cable or compressively stiff drive cables to a common actuation means or a common drive. In addition, on the rear of the vehicle, there can be an actuation switch which is coupled to the actuating means and enables opening and unlocking of the locks for opening the stowage space cover as the trunk lid.

A stowage space cover in accordance with the invention is explained in detail below using one embodiment with reference to the drawings.

DETAILED DESCRIPTION OF THE INVENTION

Figure 1:
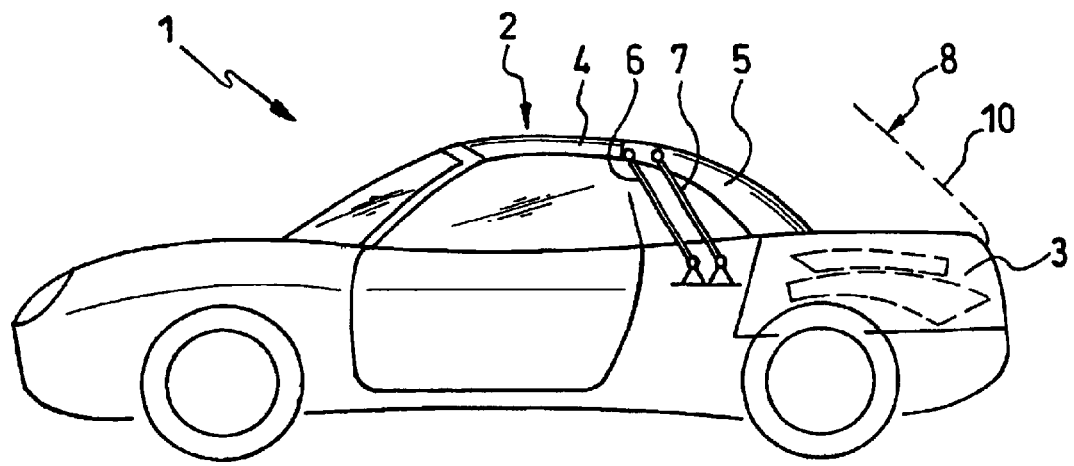
FIG. 1 is a schematic side view of a convertible with a folding hardtop roof which is in the closed position and a rear stowage space for holding the opened roof.

A convertible vehicle 1 (see FIG. 1) has a movable roof 2 which can be lowered for opening, being moved between a closed position and an open position in which it is deposited in the rear stowage space 3 or the convertible top compartment. The roof 2, according to the embodiment shown, is a movable hardtop with two rigid roof parts 4, 5 which are located in succession in the closed position. However, the roof can also have more than two roof parts and can alternatively also be a flexible soft-top with folding convertible top rods. One such hardtop roof with its bearing means for lowering the roof is disclosed, for example, in German Patent DE 199 64 029 C1 and commonly-owned, co-pending corresponding U.S. patent application Ser. No. 09/750,788 published as 2001/0040386 A1. The roof part 5, which is the rear part in the closed position of the roof 2 shown in FIG. 1, and which contains a rear window and C pillars, and adjoins a stowage space cover 8. The roof part 5 is movably supported, for example, by a schematically shown bearing means which has two connecting rods 6, 7. The stowage cover 8 has a first element in the form of a hatch carrier 9 (see FIG. 2) and a second element in the form of a hatch 10.

Figure 3:
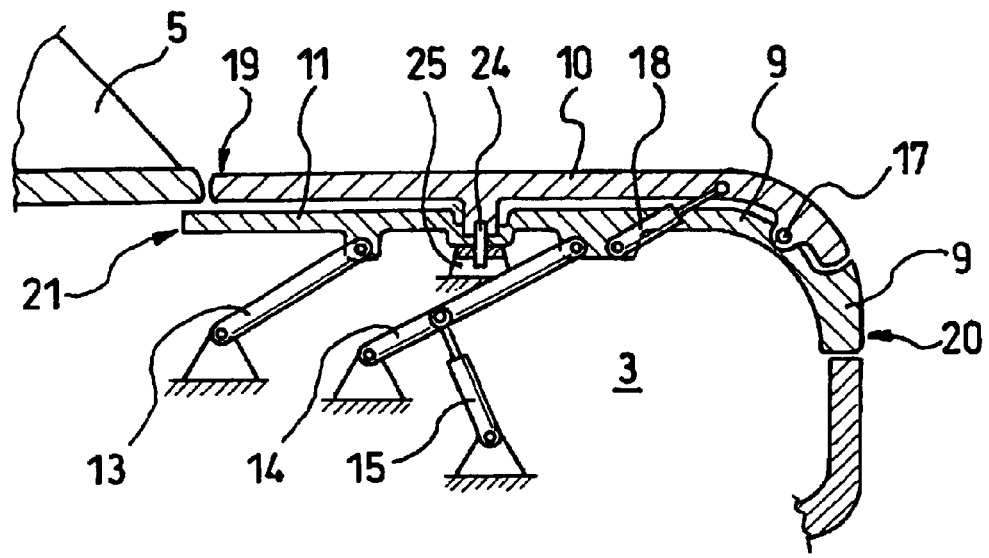
FIG. 3 a schematic lengthwise sectional view of the rear area of the convertible with the stowage space cover in the closed position.

The hatch carrier 9, in the top view, has an essentially U shape and is pivotally supported on the body by a connecting rod means on each of its two side legs 11, 12. Each connecting rod means contains, for example, a front connecting rod 13 and a rear connecting rod 14 in the manner of a four-bar mechanism. The hatch carrier 9 can be pivoted around a front edge between a closed position (FIG. 3) and an open position (FIG. 4) by a drive means, for example, an electric motor drive, a gas pressure spring or a hydraulic cylinder 15, which engages the rear connecting rod 14 and is supported on the body. The hatch 10, in its closed position, covers the recess 16 which is located between the two legs 11, 12 of the hatch carrier 9 and which is open to the front. When the closed hatch 10 is pivoted up, it clears the recess 16 so that the roof 2, or the two roof parts 4, 5, can be lowered into the stowage space and can be returned from the stowage space 3 back into its closed position.

Figure 4:
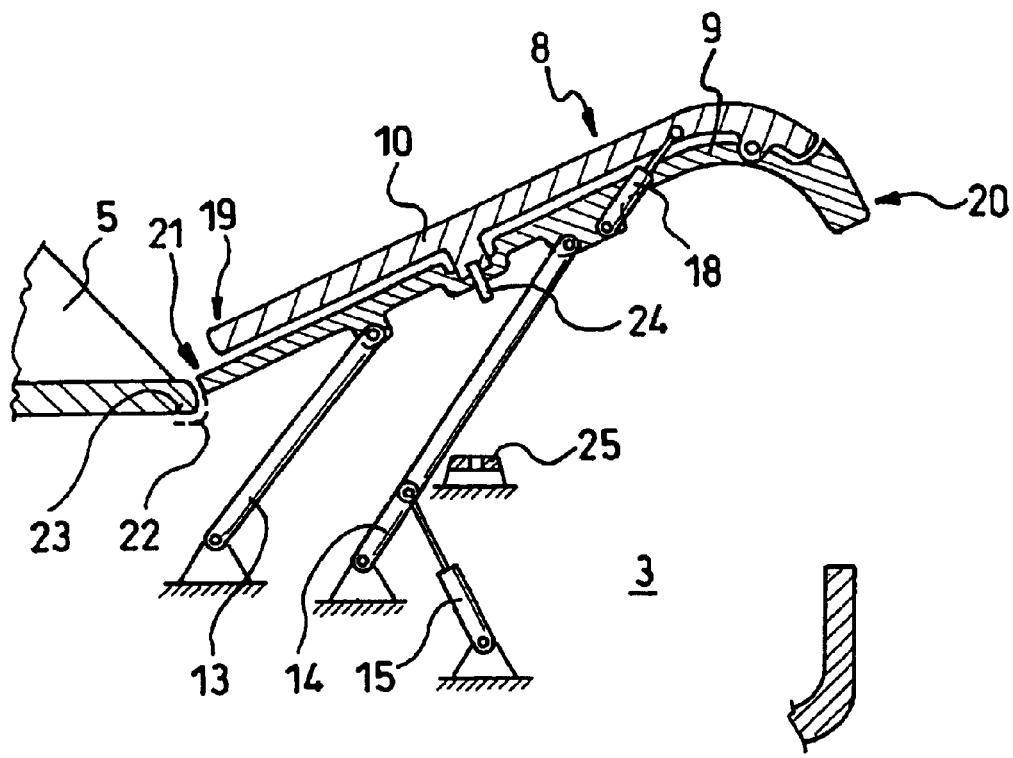
FIG. 4 is a view similar to that of FIG. 3 but showing the stowage space cover pivoted up around its front edge as the trunk lid.

The connecting rod means 13, 14 of the hatch carrier 9 is designed such that, when the hatch carrier 9 is opened by pivoting up its rear edge 20, about the front edge 21 of the hatch carrier 9, or its front outer edge and also by pivoting about the front edge 19 of the hatch 10, the front edges 19, 21 run along a respective path of motion which prevents the hatch carrier 9 and the hatch 10 from colliding with the body or the closed roof 2. For example, FIG. 4 shows a path of motion 22 of the outer end of the front edge 21 of the hatch carrier 9, and of the pivot axis, which runs essentially to rearward and/or upward when the hatch carrier 9 is pivoted up. As a result, the edge 21 is moved away from the lower edge 23 of the rear roof part 5 or is pivoted around it without causing a collision.

This possibility of establishing any path of motion by means of the design of the pivot bearing means of the hatch carrier 9 formed as a multiple bar or multiple rod means makes it possible to choose how the respective joint runs between the body parts and the movable hatch carrier 9 or the hatch 10. Thus, the external appearance of the vehicle can be designed within wide limits. The instantaneous pivoting axis (not shown) of the pivot bearing means moves on the path of motion.

The stowage space cover 8 contains a locking means with two locks 24, each of which is mounted on one of the two legs 11, 12 of the hatch carrier 9. Each lock 24 (shown schematically) is made for executing a triple function. According to the first lock function (FIG. 3), the locks 24 lock the hatch 10 on the hatch carrier 9, and at the same time, the hatch carrier 9 is held locked in its closed position on a fixed point 25 of the body. As a result, the stowage space cover 8 is locked in its closed position.

According to a second lock function (FIG. 4) the locks 24, likewise, hold the hatch 10 locked on the hatch carrier 9. However, in this case, they are unlocked from the fixed point 25 so that the stowage space cover 8 can be pivoted up at its rear to make the trunk is accessible for loading and unloading.

Figure 2:
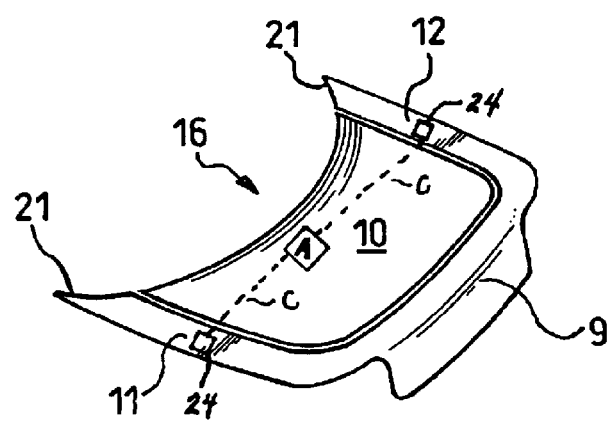
FIG. 2 is a perspective overhead view of the stowage space cover of the convertible with a stowage space hatch and a stowage space hatch carrier.

According to a third lock function, the lock 24 locks the hatch carrier 9 in its closed position on the body while it has unlocked the hatch 10. This enables the hatch 10 to be pivoted up at its front (in FIG. 1 shown by the broken line) so that the roof 2 can pass through the recess 16 into or out of the stowage space 3.

The two locks 24 of the locking means, in their closed position, stiffen the rear area of the vehicle since they form two laterally opposite fixed connections between the stowage space cover 8 and the body. The two locks 24 are connected to a central drive actuator A, for example, by actuating cables C. The actuation of the locks 24 takes place by a control which, on the one hand, causes the corresponding lock functions when the roof 2 is being opened or closed, or for loading the trunk.

The illustrated support of the stowage space cover 8 can be formed, instead of by the respective four-bar mechanism, in general, by a multiple bar means such as, for example, a septuple bar mechanism or also by support with sliding guides and pivot guides.

What is claimed is:

1. Stowage space cover of a convertible motor vehicle with a roof which can be opened and lowered into a rear stowage space of the vehicle body, the stowage space cover comprising:

first and second elements which are connected to one another, the first element having a recess for passage of the roof and a pivot bearing on a front area thereof for connection to the vehicle body and with which the first element is pivotable up at a rear edge thereof, and the second element being pivotally supported on the first element to be raised up at a front end out of a closed position in which it covers the recess of the first element, wherein the second element, in the closed position, is joined with the first element for upward movement at a rear end along with the first element as a trunk lid, wherein said pivot bearing provides a pivoting support of the first element having a movable pivot axis for the pivoting first element; and wherein the pivoting support provides a path of movement for the stowage space cover that has at least one section in which a front edge of the stowage space cover is moved at least one of rearward and upward as the first and second elements are pivoted upward together.

2. Stowage space cover as claimed in claim 1, wherein the pivoting support comprises a multiple bar linkage.

3. Stowage space cover as claimed in claim 2, wherein the multiple bar linkage comprises a four-bar mechanism.

4. Stowage space cover as claimed in claim 3, wherein the first element comprises a frame-shaped hatch carrier and the second element comprises a flat hatch.

5. Stowage space cover as claimed in claim 4, further comprising a lock means for the stowage space cover having two side locks for detachably locking the first element to the second element and to a respective fixed point of the vehicle body.

6. Stowage space cover as claimed in claim 5, wherein the two side locks are connected to a common actuating means.

7. Stowage space cover of a convertible motor vehicle with a roof which can be opened and lowered into a rear stowage space of the vehicle body, the stowage space cover comprising:

first and second elements which are connected to one another, the first element having a recess for passage of the roof and a pivot bearing on a front area thereof for connection to the vehicle body and with which the first element is pivotable up at a rear edge thereof, and the second element being pivotally supported on the first element to be raised up at a front end out of a closed position in which it covers the recess of the first element, wherein the second element, in the closed position, is joined with the first element for upward movement at a rear end along with the first element as a trunk lid, wherein said pivot bearing provides a pivoting support of the first element having a movable pivot axis for the pivoting first element;

further comprising a lock means for the stowage space cover having two side locks for detachably locking the first element to the second element and to a respective fixed point of the vehicle body.

8. Stowage space cover as claimed in claim 7, wherein the two side locks are connected to a common actuating means.

* * * * *